US011010536B2

(12) United States Patent
Hanumanula et al.

(10) Patent No.: US 11,010,536 B2
(45) Date of Patent: May 18, 2021

(54) SYSTEMS AND METHODS FOR DYNAMIC WEB USER INTERFACE GENERATION

(71) Applicant: AINS, Inc., Gaithersburg, MD (US)

(72) Inventors: Seeta Rama Hanumanula, Ashburn, VA (US); Jared D. Brower, Gaithersburg, MD (US); Yi Zhang, White Plains, NY (US)

(73) Assignee: AINS, INC., Gaithersburg, MD (US)

( * ) Notice: Subject to any disclaimer, the term of this patent is extended or adjusted under 35 U.S.C. 154(b) by 0 days.

(21) Appl. No.: 16/226,879

(22) Filed: Dec. 20, 2018

(65) Prior Publication Data

US 2020/0201936 A1 Jun. 25, 2020

(51) Int. Cl.
*G06F 3/0484* (2013.01)
*G06F 40/14* (2020.01)
*G06F 8/20* (2018.01)

(52) U.S. Cl.
CPC ............ *G06F 40/14* (2020.01); *G06F 3/0484* (2013.01); *G06F 8/20* (2013.01)

(58) Field of Classification Search
CPC .......... G06F 3/048; G06F 3/0484; G06F 8/34; G06F 16/95
See application file for complete search history.

(56) References Cited

U.S. PATENT DOCUMENTS

| | | | |
|---|---|---|---|
| 6,085,219 A * | 7/2000 | Moriya | G06F 40/166 709/200 |
| 6,826,727 B1 * | 11/2004 | Mohr | G06F 40/103 715/235 |
| 7,636,792 B1 * | 12/2009 | Ho | H04L 67/2823 709/200 |
| 8,595,103 B1 * | 11/2013 | Wargin | G06Q 10/06 705/35 |
| 9,928,230 B1 * | 3/2018 | Jain | G06F 40/103 |
| 10,416,660 B2 * | 9/2019 | Maturana | G05B 23/0283 |
| 10,445,113 B2 * | 10/2019 | Perry | G06F 3/0482 |
| 2002/0163535 A1 * | 11/2002 | Mitchell | G06F 8/38 715/744 |
| 2005/0025127 A1 * | 2/2005 | Strathmeyer | H04L 29/06027 370/352 |
| 2005/0055635 A1 * | 3/2005 | Bargeron | G06F 40/103 715/251 |
| 2005/0125771 A1 * | 6/2005 | Vitanov | G06F 16/95 717/104 |

(Continued)

*Primary Examiner* — Daeho D Song
(74) *Attorney, Agent, or Firm* — Symbus Law Group, PLLC; Martin T. Le Fevour

(57) ABSTRACT

Embodiments are described including platforms and methods used for generating dynamic web forms that are configured for a plurality of screen sizes, using relative units to determine the size of form elements, and developer-configured layouts for each screen size. A template of the dynamic web form can be generated using input from the developer. This template may contain a set of logical rules that alter the appearance or functionality of the web form based on the state and rendered display size of the dynamic web form. This template can be used to generate markup that includes the information necessary to display the web form at any of the configured layouts. Any previously configured property of the template may be modified in the future, and the modified version redistributed if desired.

17 Claims, 7 Drawing Sheets

(56) References Cited

U.S. PATENT DOCUMENTS

| | | | |
|---|---|---|---|
| 2005/0200907 A1* | 9/2005 | Kitayama | G06F 40/174 358/444 |
| 2011/0029906 A1* | 2/2011 | Hirai | G06F 8/10 715/765 |
| 2011/0276349 A1* | 11/2011 | Huang | G16H 10/20 705/3 |
| 2012/0216108 A1* | 8/2012 | Yambal | G06Q 10/10 715/234 |
| 2013/0080887 A1* | 3/2013 | Hou | G06F 40/205 715/273 |
| 2013/0205199 A1* | 8/2013 | Damera-Venkata | G06F 40/106 715/243 |
| 2013/0254655 A1* | 9/2013 | Nykyforov | G06F 40/103 715/244 |
| 2013/0283398 A1* | 10/2013 | Wu | G06F 21/60 726/28 |
| 2014/0006913 A1* | 1/2014 | Gopalakrishna | G06F 16/986 715/200 |
| 2014/0108936 A1* | 4/2014 | Khosropour | G06F 9/451 715/735 |
| 2014/0310591 A1* | 10/2014 | Nguyen | G06F 40/166 715/234 |
| 2015/0020006 A1* | 1/2015 | Kotzer | G06F 16/9577 715/762 |
| 2015/0269128 A1* | 9/2015 | Hepper | G06F 40/134 715/205 |
| 2015/0278172 A1* | 10/2015 | Tupil | G06F 40/106 715/744 |
| 2016/0071237 A1* | 3/2016 | Baldwin | G06F 3/04845 715/236 |
| 2016/0291807 A1* | 10/2016 | Chong | G06F 9/4451 |
| 2017/0315962 A1* | 11/2017 | Kovar | G06F 3/1423 |
| 2018/0046609 A1* | 2/2018 | Agarwal | G06F 8/38 |
| 2018/0095604 A1* | 4/2018 | Nguyen | G06F 40/134 |
| 2018/0143809 A1* | 5/2018 | Zang | G06F 8/35 |
| 2018/0157467 A1* | 6/2018 | Stachura | G06F 8/30 |
| 2018/0181556 A1* | 6/2018 | Chang | G06F 16/958 |
| 2018/0275971 A1* | 9/2018 | Parsolano, III | G06F 8/35 |
| 2019/0043231 A1* | 2/2019 | Uzgin | G06T 11/60 |
| 2019/0065444 A1* | 2/2019 | Sitaraman | H04L 65/602 |
| 2019/0220922 A1* | 7/2019 | Barkas | G06Q 40/12 |
| 2019/0250891 A1* | 8/2019 | Kumar | G06K 9/6257 |
| 2019/0332709 A1* | 10/2019 | Peng | G06F 40/14 |
| 2020/0004560 A1* | 1/2020 | Kaliyaperumal | G06F 3/0481 |

* cited by examiner

File a Complaint — 302

304 {
- First Name:
- Last Name:
- Phone Number:
- Complaint Category:
- Complaint Type:
- Location:
- Description:
}

Attach Documents

Submit

FIG. 3A

| File a Complaint | |
|---|---|
| First Name: | |
| Last Name: | |
| Phone Number: | |
| Complaint Category: | ▽ |
| Complaint Type: | ▽ |
| Location: | |
| Description: | |
| Attach Documents | Submit |

FIG. 3B

SYSTEMS AND METHODS FOR DYNAMIC WEB USER INTERFACE GENERATION

BACKGROUND

As the variety of devices accessing the Internet continues to increase, designing a web application capable of adapting to a wide range of display sizes has become an increasingly necessary consideration. Traditional design solutions, such as declaring the size of elements on a web form using pixels, can provide an acceptable user experience on specific devices. However, if a website was for example designed in this manner for desktop computers, displaying that site on a smaller, handheld device can often result in a poor user experience including awkward or mismatched user interface elements or manipulations which necessitate large amounts of horizontal scrolling, adjustment of the page's zoom, or other awkward or inefficient interactions. When well designed, a web application can leverage existing web technologies to provide a sufficient user experience for a significant number of existing devices while also increasing the likelihood that devices entering the market in the future will be adequately accommodated. This practice, often referred to as responsive web design, generally involves techniques and processing operating on data including all of the information necessary to render the page at any screen size and makes use of CSS or other media queries with relatively sized HTML elements to provide modified user experiences for different display sizes.

An alternative conventional strategy for adapting a web site for multiple devices involves detecting what device, browser, or size a subject page is being rendered at, and modifying the contents of the site, or redirecting the user to a corresponding specialized site if necessary. For example, a website might store or provide a desktop version and a mobile version at separate URLs, and redirect mobile browsers to the mobile URL. Alternatively, by detecting the display size of the client, a web server application can generate a unique page for different display sizes. For example, a complex desktop page might have one or more elements removed to create a more compact page to store and deliver to smaller devices. Approaches similar to these practices are again often referred to as adaptive web design. A web application does not need to rely on only one of these strategies to attempt to handle a variety of devices and sizes. Strategies such as these can be combined with responsive web design to provide support for a range of devices, while at the same time modifying the functionality of a page beyond what is achievable with CSS (Cascading Style Sheets) or other platforms and properties by themselves.

A responsive web application can be implemented using only core or underlying web technologies known today such as HTML (hypertext markup language), JavaScript™, and CSS. However, this practice is often streamlined through the use of libraries and, occasionally, simpler languages. Many libraries exist that allow a developer to incorporate CSS and JavaScript™ code that is commonly used to build adaptive and responsive web applications. By doing so, developers are able to provide more consistent behavior across the application for different devices. Although this has become a somewhat prevalent strategy for achieving the desired adaptive behavior, the requirement that developers must familiarize themselves with the web server application and work directly with the source code of the application still leaves room for abstraction and greater development efficiency.

The process of developing dynamic web forms has likewise been simplified through the use of graphical user interfaces (GUIs), which can allow dynamic web forms to be created with a reduced burden of knowledge upon the developer. In these applications, common user interface patterns or tools such as drag-and-drop allow elements to be positioned within a form without the need to write explicit markup. Many of these applications allow dynamic behavior to be added to the web form without the need for the user to directly write front-end JavaScript™ or server-side code. Traditional form design applications such as Adobe Acrobat™ and InfoPath™ and standard formats such as PDF™ (page description format), simplify the development process of dynamic web forms. However, due to their use of pixel values for their layout, it is difficult for a developer to adapt the same form for multiple screen sizes.

The various limitations of these solutions have led to the development of GUI applications designed to generate responsive web forms. These applications provide interface elements that are given relative size values, such as percentages, rather than fixed pixel values.

Furthermore, the elements are not assigned an absolute position based on where the developer places them. Rather, the elements are adapted to the display size of the form. These can range from simple structures, such as a single column that expands and shrinks horizontally, to more complex wireframes (e.g. grids that collapse to a vertical column at different screen sizes). In aspects, the interface elements according to the present teachings may be freely or arbitrarily selectable, scalable, or configurable so the developer can create and implement any desired views and user experiences, rather than rely upon preconfigured (or "canned") interface arrangements so the user's views and navigation experience can be tailored to specific applications and purposes.

However, these current GUI solutions that offer preconfigured layouts that do not provide developers with layout configuration options that may be available to a developer implementing the form with HTML and a suitable framework.

Furthermore, they offer little to no options to control the presentation logic of the web form based on the device it is being displayed on, preventing web applications generated in this manner from exhibiting truly adaptive behavior.

SUMMARY

The present teachings provide methods and systems for development and modification of responsive and adaptive dynamic web forms with the use of a graphical user interface.

A first aspect of the present teachings provides a method of generating responsive dynamic web forms through the generation of a template with the application. Template generation can be facilitated by components or services of the application, including a component or service enabling the addition of elements to the template, a component or service enabling the removal of elements from the template, a component or service enabling the design and customization of the layout of the elements, and a component or service enabling the configuration of unique layouts for a plurality of screen size classes. The template can contain the information necessary for a server application to provide client applications or other consumers with the information to display the resulting form as configured on each screen size. In embodiments, this might involve using the template to generate HTML and CSS files, and transmitting these files to a client's web browser or other application for display. According to aspects, again, the web form, template, and/or interface elements according to the present teachings may be freely or arbitrarily selectable, scalable, positionable, or configurable so the developer can freely create and implement any desired views including page layouts and user experiences, rather than rely upon rigid preconfigured or predetermined interface arrangements, so the user's views and navigation experience can be tailored to specific applications and purposes without restriction. A second aspect of the present teachings includes adding adaptive behavior to the web form by including information in the template that allows the appearance and functionality of the web form to be modified or adapted based on a set of rules operating on selected criteria, parameters, or conditions, such as the screen size category that the subject form is being displayed at. In aspects, this can be achieved by a client application transmitting the dimensions at which it will display the web form to the server application. Upon receiving this information, the server application can determine what rules in the template should be applied at that display size, and apply a set of associate rules to modify the information it transmits to the client based on the operations defined in any of the applicable rules.

A further aspect of the present teachings comprises platforms and techniques for modifying the templates generated by the application. In aspects, this might include using the application to load the template (or template file) from a storage device, and then using the application to modify the template's layout configuration for a specific screen size class. The server application could then be updated to distribute this modified template.

DESCRIPTION OF DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
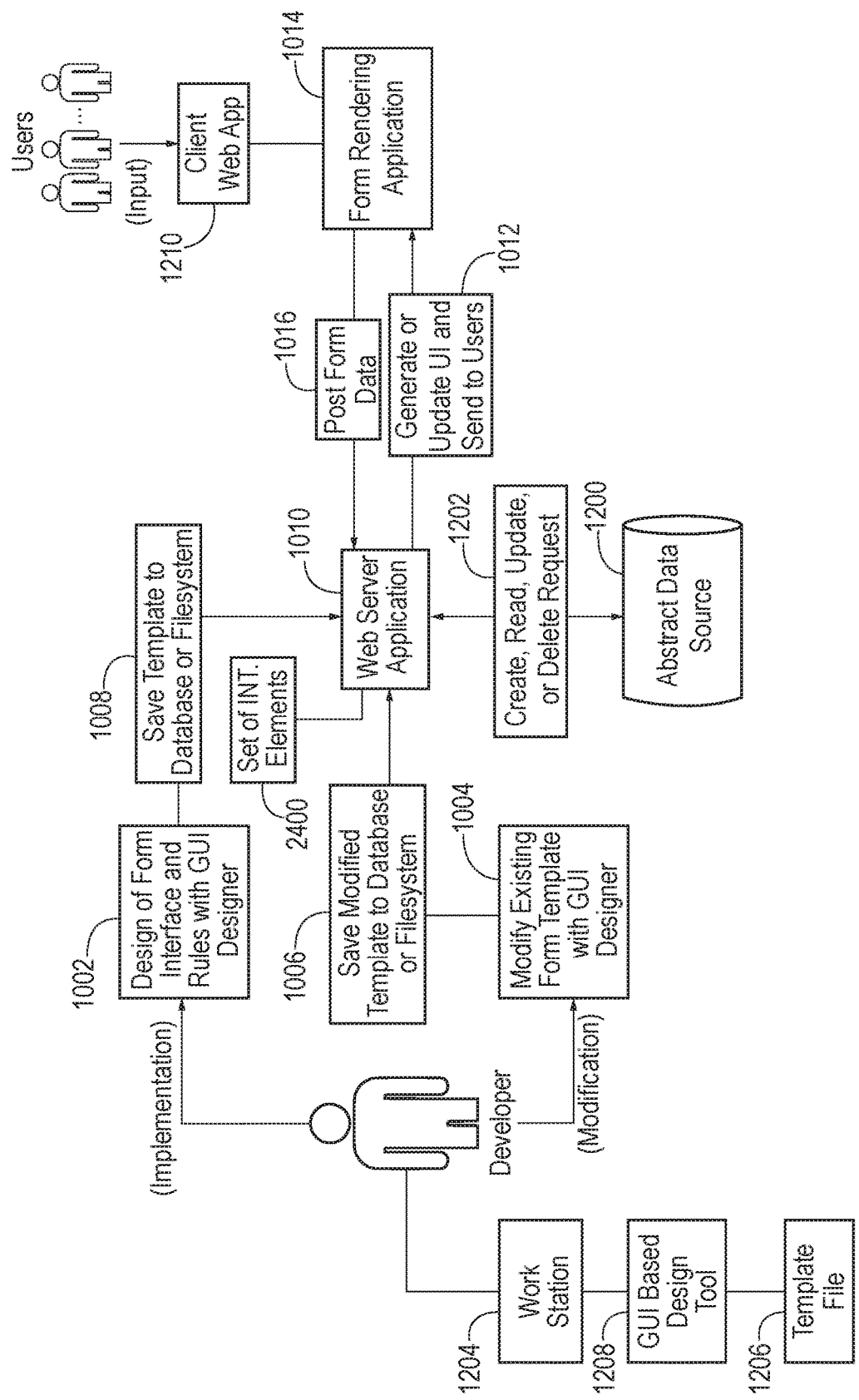
FIG. 1 illustrates a process of a developer generating a dynamic web form, according to various embodiments.

In the context of this patent application, a "rule" can comprise one or more conditions and one or more associated operations, such as at least one condition that evaluates to a logical value such as either true or false. An "operation" can be defined by at least one modification to be made to a web form's appearance or functionality when the subject condition evaluates to a predetermined value, such as true.

A "dynamic web form" refers to a web page that can leverage underlying web technologies to provide a graphical user interface facilitating a submission or retrieval of data. A "web form" can for instance be made dynamic through the use of JavaScript™ or other code to perform actions such as to modify the size or other appearance of the form, validate data, submit data, or retrieve data without a need to reload the web page.

"Adaptive web design" can refer to a technique for increasing the usability of a website across a variety of display sizes by providing clients with different versions of a website depending on the display size of the access device.

Aspects of the present teachings comprise platforms and techniques for generating and distributing responsive and adaptive dynamic web forms through the use of tools such as a graphical user interface (GUI) application and/or other resources or tools. Although details of specific implementations are provided to illustrate aspects of the inventive design, one skilled in the art may implement platforms and techniques according to the present teachings without necessarily adhering to all of these details.

In implementations, the platforms and techniques can make use of resources or tools including for instance a GUI web application, a server application, and a client web application such as a conventional web browser. The GUI web application can facilitate the generation of web form templates (and/or associated template files storing or encoding those templates) through multiple user interface components or elements. A collapsible panel can be provided, containing a selection of responsive elements that a web form developer can position within the views of the web form, for instance through a drag-and-drop interaction. A second collapsible panel can also be provided, which allows for the configuration or adaptation of the rules that control the appearance and functionality of the dynamic web form, including rules that execute or evaluate based on the web form display size. A third collapsible panel can be provided as well, which can provide the developer with an interface for configuring the layout of the elements in the web form at multiple screen sizes. This interface can work by adjusting the width of container elements within the form using percentages as units; alternative implementations could use different scaling techniques including systems of units such as fractional values or a custom abstraction. Finally, buttons can be provided that allow the saving of templates and loading of templates for modification.

The web server application can comprise standard functionality of sending data to clients and receiving data from clients, configuration options allowing the addition, removal and updating of templates, and the ability to generate core web resources such as HTML and CSS files from templates. These generated files can contain all the layout information that was configured by the developer. However, if the developer has added rules to the template that execute modifications or adaptations based on the size the web form will be displayed at, an additional step may be required to apply these rules to the files. The server may additionally receive the size the web form will be displayed at from the client, check if the conditions of any applicable rules are true, and modify the HTML and CSS files or other information it generates based on the operations defined in or by any rules with a true condition. In addition functionality expected of a web form, the client web application may have the ability to read the size it will be displaying the dynamic web form at and send that information to the server.

Aspects of the present teachings may be exemplified by a software developer or other operator utilizing the aforementioned implementations or others to generate a responsive and adaptive dynamic web form which allows users to submit information or forms, such as complaints, to their local government or other agency or entity.

Figure 2:
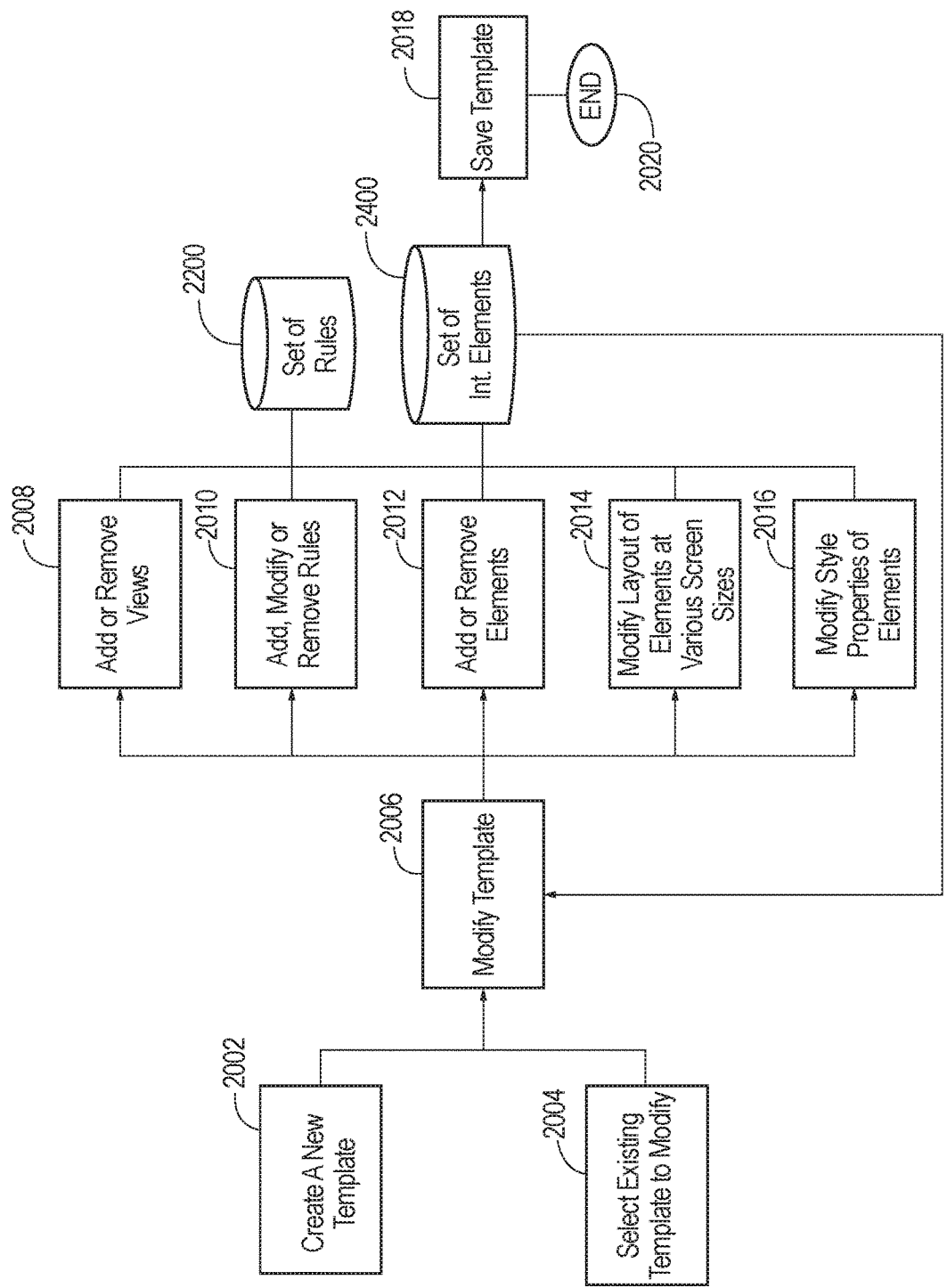
FIG. 2 illustrates a process of generating a dynamic web form for a plurality of display size classes, according to various embodiments.

Aspects of a process for generating dynamic web forms in this and other regards are shown, for example in FIGS. 1 and 2. In 1002, a software developer or other operator can initiate the design of a form interface, including by creating or accessing a set of interface elements 2400 (e.g. shown in FIG. 2) as well as a set of rules 2200 (e.g. shown in FIG. 2). The software developer or other operator can in aspects access or use a workstation 1204 to perform development activity, such as a desktop computer, a laptop computer, a network-enabled phone or other mobile or other device. Alternatively, a software developer or other operator can use workstation 1204 to begin in 1004 to modify an existing template file 1206 or other document or form using tools such as a GUI-based design tool, following which the software developer or other operator can save or store a modified template file 1206 to storage, such as a database or file system.

In 1008, the software developer or other operator can save or store a newly-created template file 1206 to storage, such as a database or file system. The template filed can store or encode, for example, a set of interface elements 2400 (e.g. as depicted in FIG. 2), as well as the layout or configuration of those elements, or other data or metadata associated with a given web or page view. Following 1008, a newly-created or modified template file 1206 can be transmitted to a web server application 1010 or other form distribution and rule execution system.

In aspects, an abstract data source 1200, for example a data source stored in a database or in a cloud-based network, can be accessed to deliver or process a form or service related to a user request. In 1202, a user request can be created, read, updated, or deleted, for instance, after one or more users use a client web application 1210, such as a web browser, to access a web site or service to initiate a form such as a complaint form or other type of form or service. The request can be communicated to web server application 1010 or other form distribution and rule execution system. In aspects, the web server application 1010 or other form distribution and rule execution system executing in 1010 can generate or update a set of interface elements 2400, which can be transmitted to a form rendering application executing in 1014. The form rendering application executing in 1014 can transmit or post the resulting for data to the web server 1010 or other form distribution and rule execution system. Processing activity can subsequently repeat, jump to another processing point, or end.

Aspects of a process for generating dynamic web forms according to the present teachings in further regards are shown, for example in FIG. 2. In 2002, a software developer or other operator can begin to create, specify, or generate a new template file 1206. Alternatively, if desired in 2004, a software developer or other operator can begin to select or access an existing template file 1206 to modify or update. In 2006, the software developer or other operator can begin to modify the subject template file 1206, whether newly-created or existing, using a set or series of actions as shown in the figure. Although various actions are illustrated from top to bottom in 2008 through 20016, it will be appreciated that any one or more of those or other actions can be undertaken or performed in any desired order or sequence.

Figure 3C:
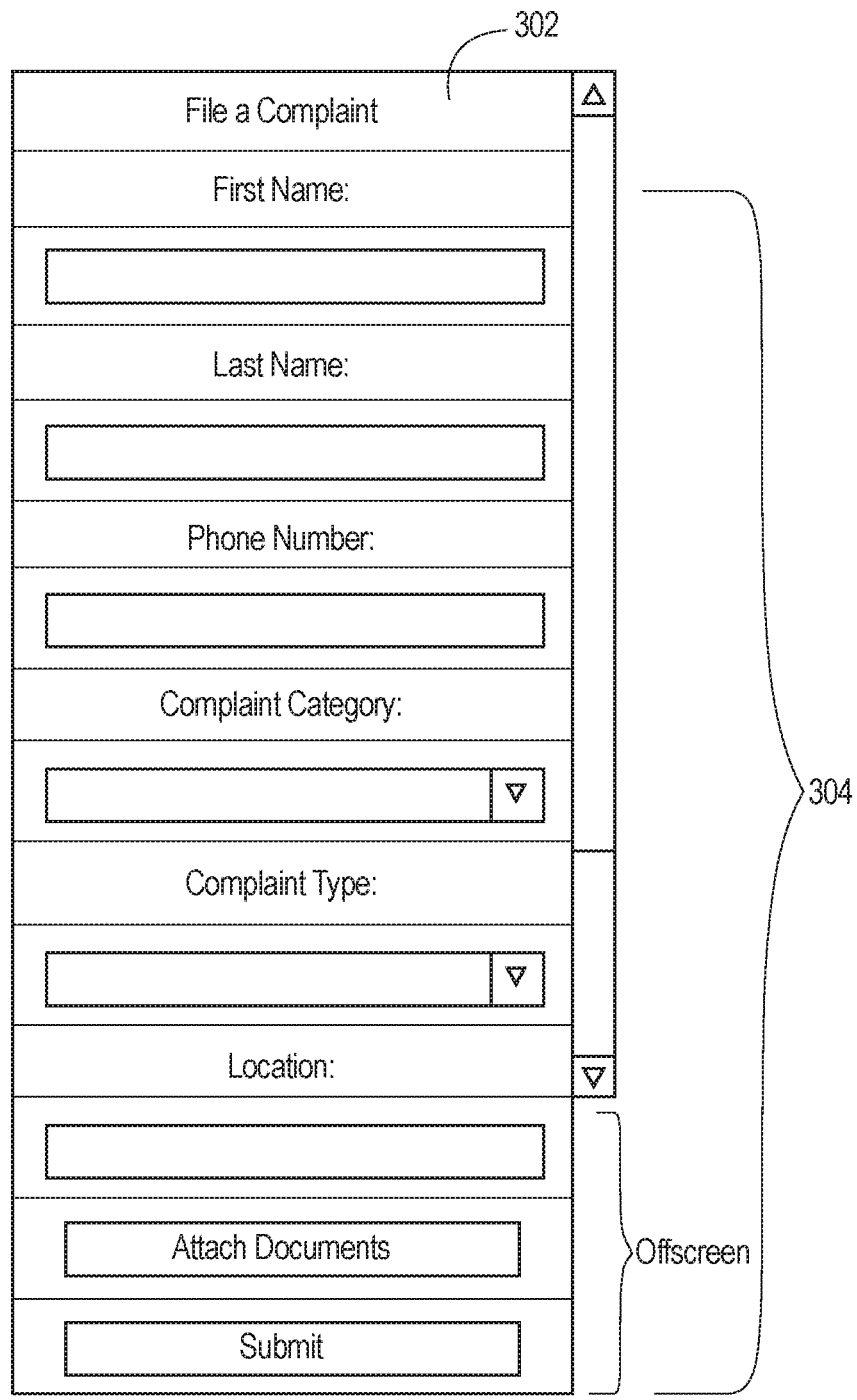
FIGS. 3A through 3 D illustrate an illustrative web form generated according to the present teachings, at three exemplary display sizes, according to various embodiments.
Figure 3D:
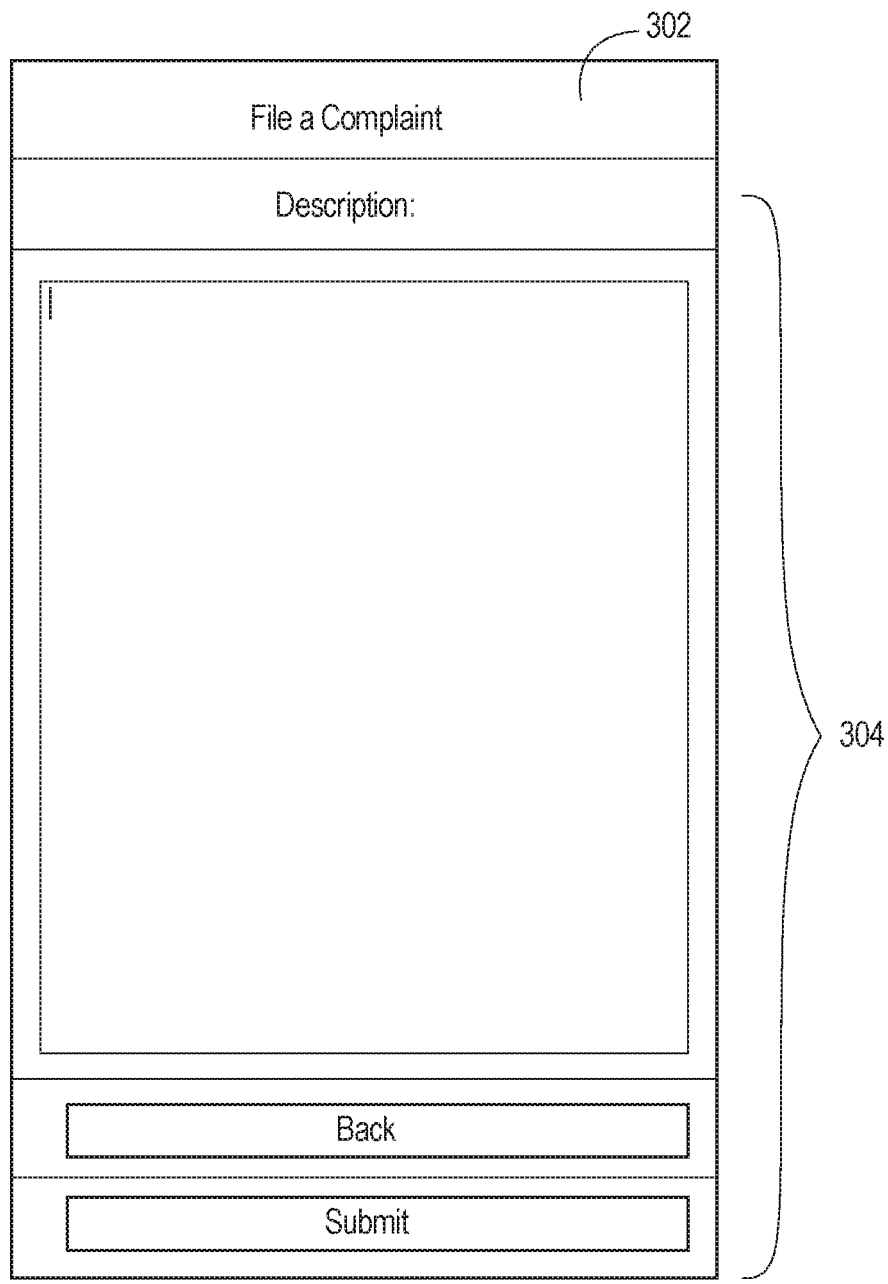

In 2008, the software developer or other operator can for instance begin to add or remove views from a subject template file 1206, such as, merely for instance, a complaint view 302 (e.g. FIG. 3). In 2010, the software developer or other operator can for instance add, modify, or remove rules in a set of rules 2200, such as rules governing display size or the configuration of a set of interface elements 2400, such as, for example, data entry fields, drop-down menus, selectors such as radio button selections or others, text entry boxes, sliders, or others. In 2012, the software developer or other operator can add, modify, or remove one or more elements in the set of interface elements 2400. In 2014, the software developer or other operator can arrange or modify a layout of interface elements at various screen sizes, to attempt for example to arrange the elements so that all desired elements are visible or selectable within the confines of a given display size. In 2016, the software developer or other operator can configure or modify style properties or other properties for one or more elements in the set of interface elements 2400.

In 2018, the subject template file 1206 can be saved to storage, such as a local or remote database or to a cloud-based service. In 2020, processing can repeat, return to a prior processing point, or jump to a further processing point, or end.

Exemplary implementations of a governmental complaint type of form and application are for example shown in FIGS. 3A-3D. The form may be connected to a data source 1200 (as shown e.g. in FIG. 1), allowing users to select from predefined options, including a complaint view 302 (e.g. for illegal parking, noise) as well as a category the problem falls under (e.g. public health, zoning). Although implementations are described and illustrated in FIGS. 3A-3D with regard to a form of this type, it will be appreciated that platforms and techniques according to the present teachings can be applied and used to generate a variety of other forms, services, and/or applications.

The developer may begin designing, constructing, or modifying the subject web form. As shown for instance in FIG. 3A, the developer can create an initial complaint view 302 of the web form, which can contain a set of interface elements 304. The set of interface elements 304 can include, merely for example, various fields and/or other elements. According to aspects generally shown in FIGS. 3A-3D, features or characteristics can be configured or modified such as, for instance, to alter the vertical spacing or dimensions of the set of interface elements 304, such as for example shown in FIG. 3B as compared to that of FIG. 3A. Likewise, in cases such as that shown in FIG. 3C, interface elements such as a slider bar can be added, and/or an offscreen area can be specified, such as to permit a scrollable section of a page to be opened up. In addition or instead, platforms and techniques according to the present teachings can allow a software developer or other operator to enlarge or scale a description input field, and/or modify a "back" and "submit" navigation button to occupy a vertical column rather than a horizontal row, as illustratively shown in FIG. 3D. Other modifications or configurations are possible.

In aspects, set of interface elements 304 can merely for example include stacks including a certain number of containers, such as eight, creating eight rows in which to position data entry fields or other elements. Other numbers of rows or other elements can be used. In aspects as shown, for instance in FIG. 3A, fields for data entry can include fields or selectors for first name and last name or other identifiers, phone number, complaint category, complaint type, location, description, and/or others. The developer can then for instance split the rows into multiple columns. In aspects, the first row can be left as a single column, the second row can be split into fourths, and the remaining rows can be split in half, in exemplary instances, to achieve desired views or proportions of displayed elements. In the top row, the developer can add a label, as illustrated in each of FIGS. 3A-3D, with text such as "File a Complaint" to indicate an associated action. In the second row, the developer can add various fields from left to right such as a first name label, a first name input field, a last name input, and a last name input field, as for example shown in FIG. 3A. In the third row, a phone number label and input field can be added. In the fourth row, a "Complaint Category" label and select element can be added. In the fifth, a "Complaint Type" label and select element can be added. In the sixth row, as for instanced shown in FIG. 3B, a "Location" label and text input field can be added. In the second to last row, a "Description" label and multi-line text input field can be added. Finally, in the last row, two buttons can be added, one for attaching supporting documents, and one for submitting the form, as likewise illustratively shown in FIG. 3B.

The developer can add one or more additional interface elements or views which will provide a separate view for users on small screens to fill in the description. Four containers can be stacked vertically, creating four rows, and the last one can be split into two columns. Merely as illustration, a "File a Complaint" label identical to the one in the first view can be added to the first row. In the second row, a "Description" label can be added, followed in the third row by a multi-line text input, as well as a "Back", and "Submit" button in the final row.

The developer can then begin to configure the layout of the form for various adaptive conditions such as different display size classes. The exemplary designer application can for instance be configured to function with three classes, such as handheld devices, tablets, and desktops. In implementations, the application can be modified or reconfigured to remove classes or add additional classes.

In order to configure the view for instance for desktops, the developer can leave the first and last rows in their default states. This leaves the first row with one column with 100% width, and the last row with two columns with 50% width. The developer can then configure each column containing a label to have a width of 20%, and the columns in rows three through seven containing inputs to have a width of 80%. In implementations, these width settings may only be applied when the web form is being displayed at a larger size than a cutoff that can be defined in the application. In this illustration, the cutoff can merely for example be configured to 1365 pixels or other amounts.

The developer can then begin to configure the form for an additional class of device, which can be or include for instance tablets. To start, the developer can apply the same settings that were used for the desktop size class to the tablet class. Then, the developer can for instance modify elements such as the second row or others. The columns in this row containing labels can be set to 20% width, and the columns containing text inputs can be set to 80% width. The combined widths of these columns now exceed 100%. This setting will cause standards-compliant web browsers to wrap the second label and second input in this row below the first label and input. These settings will be applied at screen sizes larger than the cutoff defined for tablets (e.g. 719 pixels or other amounts) and smaller than the desktop cutoff. Finally, the dynamic web form can be configured for one or more additional classes, which can be or include for instance a "phones" class. These settings can for example be applied for all display sizes smaller than the tablet cutoff. Every column can for instance be set to 100% width, causing every column to stack vertically.

Next, the developer can configure the layout of the second view for multiple devices. The developer can leave the form in its default state for desktops and tablets, with the first three rows for example containing a column with 100% width, and the final row containing two 50% width columns. Other values can be used. For the phone class, the developer can configure the columns in the last row for instance to each have 100% width, causing them to stack vertically at this display size.

The developer can additionally add, configure, or modify a set of rules 2200 to the template file 1206 that will alter the appearance and functionality of the form based on the device it is displayed on. An exemplary first rule can hide the "Description" label and multi-line text input when the first view is rendered for the phone display class. The developer can then add a rule that will change the text of the "Submit" button to "Next" when the form is rendered for the phone display class. Furthermore, the developer can add more rules to define the functionality of this button or other elements at different display sizes. One rule can execute when the "Submit" button is pressed on tablet and desktop display sizes, and cause the form to be submitted. Another rule can execute at phone display classes when the "Submit" button (which will read "Next" on phone display sizes) is pressed. Rather than submit the form, this rule can instead save the input so far, and navigate the user to the second view. The developer can then save the web form, receiving a template file 1206.

The template file 1206 can then be provided to or made accessible by the web server application to client applications or services. When a client web application requests the form, the client web application can provide its display size to the web server along with the request. If the web form did not include rules with the display size as a condition, this processing may not be necessary. The server application can then use the template file 1206 to generate a HTML or other representation of the first view of the web form, as well as a CSS file that contains media queries supporting the layouts defined by the developer. Next, the web server can execute any applicable rules. If the display size for instance was reported to be within the phone class, the "Submit" button's text can be replaced with the text "Next", and the "Description" label and multi-line text input can be removed from the first view in the HTML representation. The modified HTML can then be transmitted to the client, along with the CSS file and any other associated resources. As the client application moves through the states of the web form, it can communicate further with the web server. If the client reported it was within the phone class, this can result in a HTML representation of the second view being returned to the client when the "Next" button is clicked.

At later times, if the developer chooses to modify the web form, the template form 1206 can be imported into the GUI application. This can return the GUI application to the same state that it was in when the developer saved the template file 1206, and allow the developer to make modifications to the design of the template file 1206. By saving the modified template file 1206 and providing the modified version of the template file 1206 to the web server application, the web form can be updated.

Figure 4:
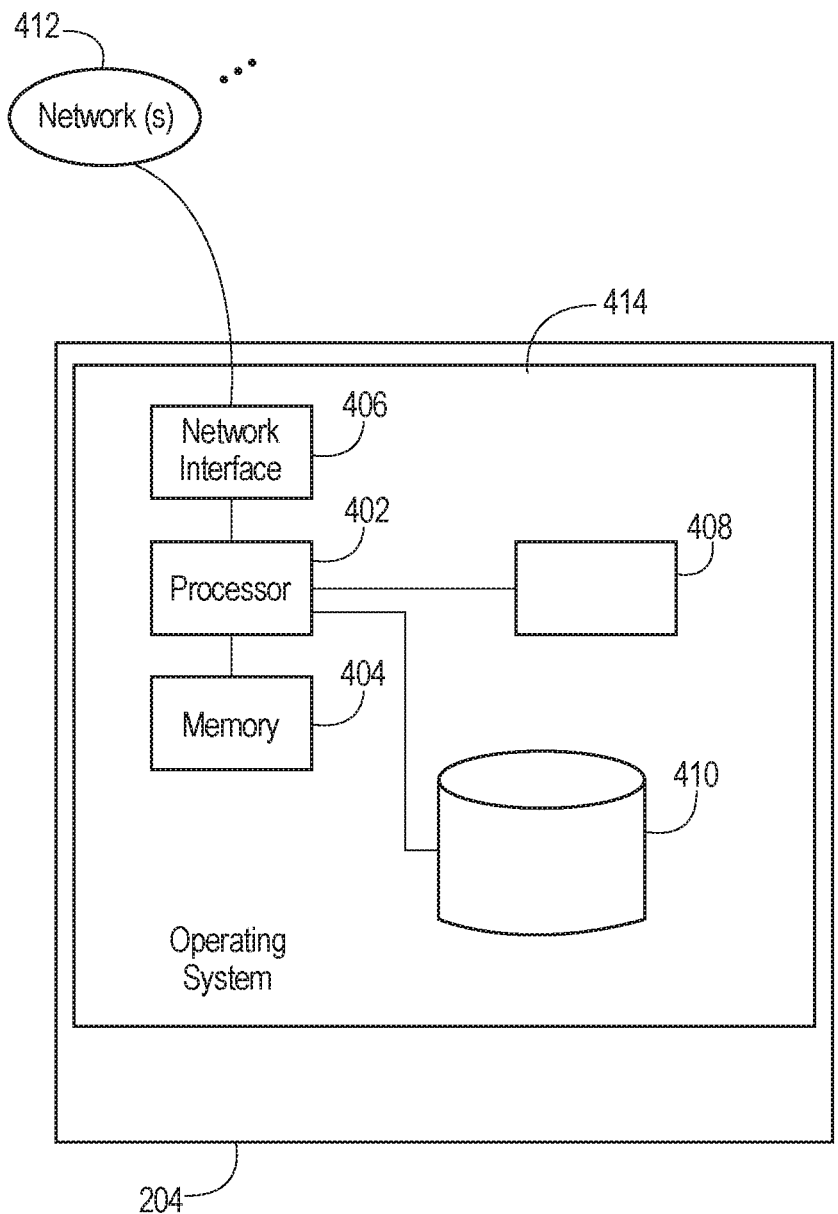
FIG. 4 illustrates exemplary hardware, software, and other resources that can be employed in a form generation platform, according to various implementations.

FIG. 4 illustrates various hardware, software, and other resources that can be used in platforms and techniques according to embodiments of the present teachings. In embodiments as shown, the workstation 1204 can comprise a server, farm, cluster, cloud-based network, or other platform including processor 402 communicating with memory 404, such as electronic random access memory, operating under control of or in conjunction with an operating system 414. The processor 402 in embodiments can be incorporated in one or more servers, and/or other computers, logic, or hardware resources, and/or as noted can be implemented using cloud-based resources. The operating system 414 can be, for example, a distribution of the Linux™ operating system, the Unix™ operating system, or other open-source or proprietary operating system or platform. The processor 402 can communicate with a database 410, such as a database or data store stored on a local hard drive or drive array, to access or store information such as a set of rules 2200, a set of interface element 2400, and/or subsets of selections thereof, along with other content, code, media, or other data. The processor 402 can further communicate with a network interface 406, such as an Ethernet or wireless data connection, which in turn communicates with the one or more networks 412, such as the Internet or other public or private networks. The processor 402 can, in general, be programmed or configured to execute control logic and to control various processing operations, including to generate templates, rules, and/or other information related to dynamic web forms. In aspects, other controls or logic herein can be or include resources similar to those of the workstation 1204, and/or can include additional or different hardware, software, and/or other resources. Other configurations of the workstation 1204 and overall architecture according to the present teachings, associated network connections, and other hardware, software, and service resources are possible.

The foregoing description is illustrative, and variations in configuration and implementation may occur to persons skilled in the art. For example, while instances have been described in which the developer can generate or access set of rules 2200, in implementations, multiple sets of rules or other conditional logic can be used, for example stored or supplied by or from different sources. Other resources described as singular or integrated can in embodiments be plural or distributed, and resources described as multiple or distributed can in embodiments be combined. The scope of the present teachings is accordingly intended to be limited only by the following claims.

What is claimed is:

1. A method, for a form creator, of generating a dynamic web form on an end user computing device comprising:
providing a server with a web server application stored thereon and a database in communication with the server;
a form creator computing device accessing the web server application; in response, the accessed web server application:
generates a graphical user interface on the form creator computing device;
captures input from the form creator computing device through the graphical user interface to create a template of a set of web form interface elements along with a set of accompanying rules;
stores the created template to the database;
an end user computing device sending a request to the web server application, wherein the request contains information about display size of the end user computing device;
in response to the request, retrieving the stored template and dynamically generating a code set specific to the end user computing device from the template based on the information about the display size of the end user computing device contained in the request;
sending the generated code set to the end user computing device; and
displaying a web form on the end user computing device from the generated code set for the end user to input information in to.

2. The method of claim 1, wherein:
the stored template contains a first web form interface element having a first rule for a first display size as defined by the form creator;
in response to the request from the end user computing device, which indicates the end user computing device is the first display size, the first rule is used to generate the code sent to the end user computing device; and
the sent code includes code that renders a first user interface element on the web form having a first behavior characteristic.

3. The method of claim 2, wherein the first behavior characteristic is saving input form data such that when the first user interface element is selected, the first behavior characteristic causes the generated code to send data input to the web form for storage on a database.

4. The method of claim 3, wherein text is rendered on the first user interface element and the rendered text is the word "submit".

5. The method of claim 2, wherein:
the first web form interface element contained on the stored template having a second rule for a second display size as defined by the form creator;
in response to the request from the end user computing device, which indicates the end user computing device is the second display size, the second rule is used to generate the code sent to the end user computing device; and
the sent code includes code that renders a second user interface element on a first page of the web form having a second behavior characteristic.

6. The method of claim 5, wherein the second behavior characteristic is saving partial input form data and causing a second page of the web form to be rendered such that when the second user interface element is selected, the second behavior characteristic causes the generated code to send the data input on the first page of the web form for storage on a database and sends a second request to the web server application, wherein the second request contains information that the end user has completed entering data into the first page of the web form;
in response to the second request, dynamically generating an additional code set specific to the end user computing device;
sending the additional generated code to the end user computing device; and
rendering a second page of the web form on the end user computing device for the end user to input information in to; and
the sent code includes code that renders a third user interface element on the second page of the web form having a third behavior characteristic, such that when selected, the third characteristic behavior causes the generated code to send data input to the second page of the web form for storage on the database.

7. The method of claim 6 wherein:
text is rendered on the second user interface element and the rendered text is the word "next"; and
text is rendered on the third user interface element and the rendered text is the word "submit".

8. The method of claim 1 further compromising:
retrieving the stored template;
accepting modifications, by the form creator, of the set of web form interface elements along with the set of accompanying rules of the stored template; and
storing the modified template to the database.

9. The method of claim 1, wherein the generated code is a hypertext markup language file and a cascading style sheet file that contains media queries.

10. The method of claim 1, wherein the rules in the stored template define display characteristics of the web form interface elements on the end user computing device based on the display sizes compromising handheld devices, tablets and desktops.

11. A dynamic web form generation server, for a form creator to create a dynamic web form, comprising:
   a processor; and
   a non-transitory computer-readable medium comprising a web server application stored thereon, the web server application comprising program instructions, the execution of which by the processor causing the web form generation server to:
   generate a graphical user interface on a form creator computing device;
   capture input from the form creator computing device through the graphical user interface to create a template of a set of web form interface elements along with a set of accompanying rules;
   store the created template to a database;
   receive a request from an end user computing device, wherein the request contains information about display size of the end user computing device;
   in response to the request, retrieve the stored template and dynamically generate a code set specific to the end user computing device from the template based on the information about the display size of the end user computing device contained in the request; and
   send the generated code set to the end user computing device for displaying a web form on the end user computing device from the generated code set for the end user to input information in to.

12. The dynamic web form generation server of claim 11, wherein:
   the stored template contains a first web form interface element having a first rule for a first display size as defined by the form creator;
   in response to the request from the end user computing device, which indicates the end user computing device is the first display size, the first rule is used to generate the code sent to the end user computing device;
   the sent code includes code that renders a first user interface element on the web form having a first behavior characteristic.

13. The dynamic web form generation server of claim 12, wherein the first behavior characteristic is saving input form data such that when the first user interface element is selected, the first behavior characteristic causes the generated code to send data input to the web form for storage on a database.

14. The dynamic web form generation server of claim 11 further compromising the execution of the web server causing the web form generation server to:
   retrieve the stored template;
   accept modifications, by the form creator, of the set of web form interface elements along with the set of accompanying rules of the stored template; and
   store the modified template to the database.

15. The dynamic web form generation server of claim 11, wherein the generated code is a hypertext markup language file and a cascading style sheet file that contains media queries.

16. The dynamic web form generation server of claim 11, wherein the rules in the stored template define display characteristics of the web form interface elements on the end user computing device based on the display sizes compromising handheld devices, tablets and desktops.

17. A non-transitory computer-readable medium comprising a web server application stored thereon and comprising program instructions, for a form creator to generate a dynamic web form, which when executed by at least one computer processor implements a method, wherein the method includes:
   generating a graphical user interface on a form creator computing device;
   capturing input from the form creator computing device through the graphical user interface to create a template of a set of web form interface elements along with a set of accompanying rules;
   storing the created template to a database;
   receiving a request from an end user computing device, wherein the request contains information about display size of the end user computing device;
   in response to the request, retrieving the stored template and dynamically generating a code set specific to the end user computing device from the template based on the information about the display size of the end user computing device contained in the request; and
   sending the generated code set to the end user computing device for displaying a web form on the end user computing device from the generated code set for the end user to input information in to.

* * * * *